US010328981B2

(12) United States Patent
Sibilleau

(10) Patent No.: US 10,328,981 B2
(45) Date of Patent: Jun. 25, 2019

(54) MODULAR RAIL SLIDES

(71) Applicant: Guy Sibilleau, Roseau, MN (US)

(72) Inventor: Guy Sibilleau, Roseau, MN (US)

(*) Notice: Subject to any disclaimer, the term of this patent is extended or adjusted under 35 U.S.C. 154(b) by 43 days.

(21) Appl. No.: 14/975,206

(22) Filed: Dec. 18, 2015

(65) Prior Publication Data
US 2017/0174276 A1 Jun. 22, 2017

Related U.S. Application Data

(60) Provisional application No. 62/266,445, filed on Dec. 11, 2015.

(51) Int. Cl.
B62D 55/08 (2006.01)
B62D 55/084 (2006.01)
B62M 27/02 (2006.01)
B62D 55/10 (2006.01)

(52) U.S. Cl.
CPC ........... *B62D 55/084* (2013.01); *B62D 55/08* (2013.01); *B62D 55/0847* (2013.01); *B62D 55/10* (2013.01); *B62M 27/02* (2013.01); *B62M 2027/025* (2013.01); *B62M 2027/026* (2013.01)

(58) Field of Classification Search
CPC ........... B62M 27/02; B62M 2027/026; B62M 2027/025; B62D 55/08; B62D 55/10; B62D 55/0847
USPC ........................................ 305/121, 122, 127
See application file for complete search history.

(56) References Cited

U.S. PATENT DOCUMENTS

| | | | | |
|---|---|---|---|---|
| 2,824,746 A * | 2/1958 | Schummer | .............. | B62B 17/02 280/28 |
| 3,751,057 A * | 8/1973 | Matthiessen | ............ | B62B 17/02 280/15 |
| 3,770,330 A * | 11/1973 | Bombardier | ........... | B62D 55/07 305/127 |
| 3,841,717 A * | 10/1974 | Parisotto | ................ | B62D 55/07 180/193 |
| 3,887,243 A * | 6/1975 | Chaumont | ............. | B62D 55/24 180/193 |
| 4,714,125 A * | 12/1987 | Stacy, Jr. | ................ | B62D 11/22 180/182 |
| 5,947,220 A * | 9/1999 | Oka | ....................... | B62M 27/02 180/193 |
| 6,155,656 A * | 12/2000 | Gulla | ..................... | B62D 55/24 305/127 |
| 6,619,417 B2 * | 9/2003 | Lemieux | ................. | B62M 27/02 180/182 |
| 2009/0008990 A1 * | 1/2009 | Sibilleau | .............. | B62D 55/104 305/127 |
| 2012/0160150 A1 * | 6/2012 | Handfield | .............. | B62M 27/02 116/208 |

* cited by examiner

Primary Examiner — Jason R Bellinger
Assistant Examiner — Scott A Browne
(74) Attorney, Agent, or Firm — Brooks, Cameron & Huebsch, PLLC

(57) ABSTRACT

Devices, methods, and systems, for a modular rail slide are described herein. One or more embodiments include a modular rail slide, comprising: a first slide module comprising a first number of inserts coupled to the first slide module, and a second slide module, coupled to the first slide module, comprising a second number of inserts, and wherein the second slide module is coupled to a first coupling end of the first slide module.

20 Claims, 13 Drawing Sheets

MODULAR RAIL SLIDES

TECHNICAL FIELD

The present disclosure relates to methods, devices, and systems, for modular rail slides.

BACKGROUND

Snowmobiles can have a front steering ski and a track suspension system carried by a sub-frame. In some examples, the track suspension can be on a rear portion of the snowmobile compared to the ski. The track suspension system of the snowmobile can determine shock absorbing capability, stability, handling, traction, and/or power requirements of the snowmobile.

In some examples, a snowmobile can utilize a slide rail suspension system where a lower run of the drive track travels in sliding engagement with a pair of longitudinally extending rail beams. Rail slides can bear a relatively large portion of a mass of the snowmobile upon an interior portion of the track. In some examples, the track can rotate around the suspension system and slide under the rail slides as it contacts a ground surface.

DETAILED DESCRIPTION

Figure 1:
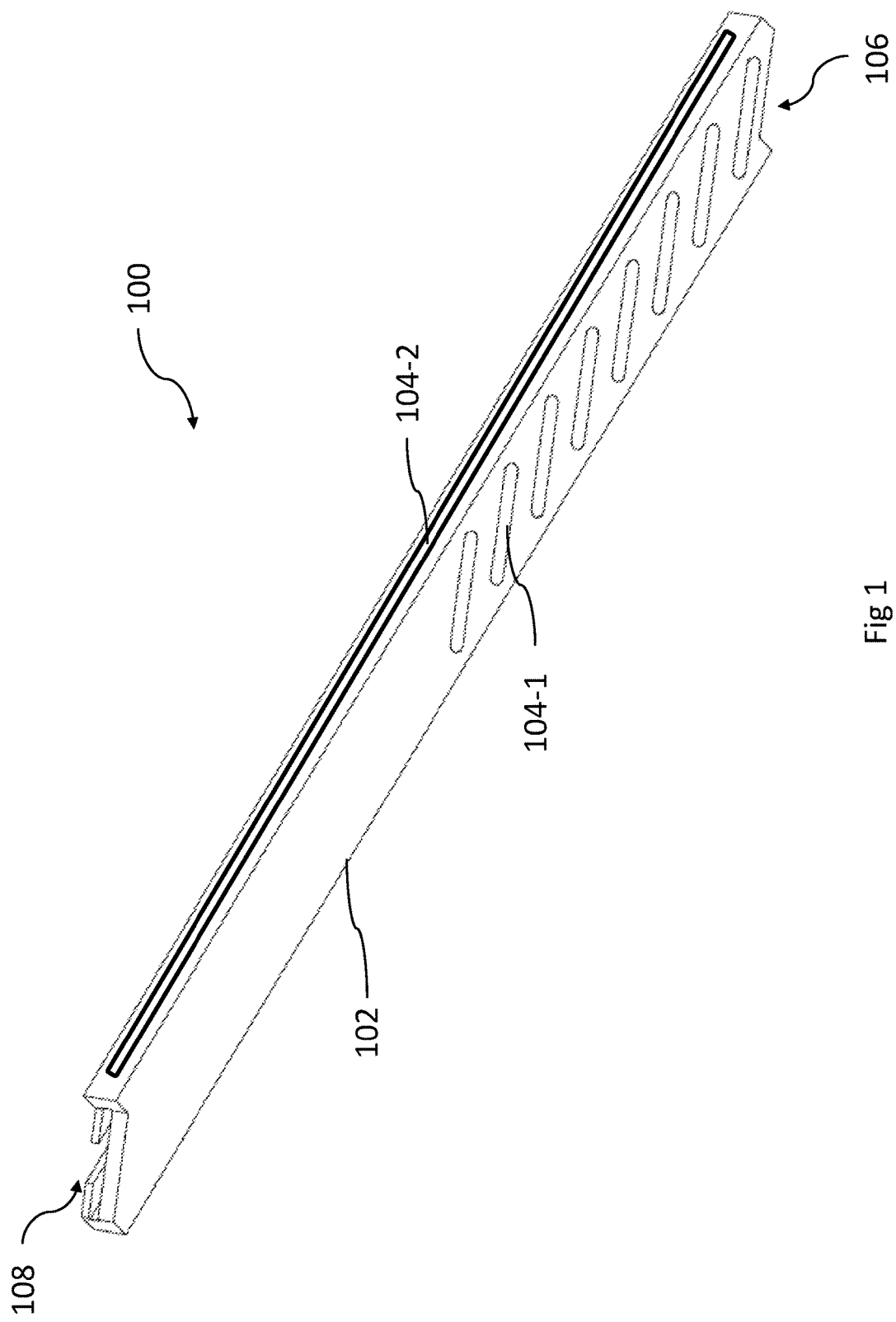
FIG. 1 is an example of a modular rail slide according to one or more embodiments of the present disclosure.

Devices, methods, and systems for a modular rail slide are described herein. For example, one or more embodiments can include a modular rail slide, comprising: a first slide module comprising a first number of inserts coupled to the first slide module, and a second slide module, coupled to the first slide module, comprising a second number of inserts, and wherein the second slide module is coupled to a first coupling end of the first slide module.

The modular rail slide described herein can include a modular rail slide system. In some examples, the modular rail slide system can include multiple rail slide modules that can be coupled together to provide a complete modular rail slide. In some examples, the complete rail slide can be utilized as part of a track suspension system. For example, the modular rail slide system can be coupled to a rail beam of a slide rail suspension system. In some examples, the track suspension system (e.g., slide rail suspension system, etc.) can be utilized on a snowmobile.

As used herein, coupling a first slide module to a second slide module can include placing the first slide module next to the second slide module so that the first slide module is physically touching (e.g., in physical contact with, etc.) the second slide module. In some examples, coupling a first slide module to a second slide module can include mechanically attaching the first slide module to the second slide module. In these examples, a number of mounting devices can be utilized to mechanically couple the first slide module to the second slide module. In some examples, coupling a first slide module to a second slide module can include mechanically coupling the first slide module to a rail beam and coupling the second slide module to the rail beam when the first slide module and the second slide module are physically touching each other.

The rail slide modules described herein can be formed by an injection molding device (e.g., injection molding machine, etc.). In previous systems and methods, a single mold for a compression molding device may be developed for each complete rail slide that has a different length. For example, a first mold would need to be utilized for a first length of a complete rail slide and a second, different mold would need to be utilized for a second length of a complete rail slide.

The rail slide modules described herein can be formed by a single mold for the injection molding device and the rail slide modules can be coupled together to form different size complete rail slides for different track suspension systems. In some examples, the rail slide modules can be coupled together to provide a consistent distance (e.g., equal distance, etc.) between each of a plurality of inserts.

The modular rail slide embodiments discussed herein can provide a number of benefits. For example, modular rail slide embodiments described herein can reduce heat caused when implemented in the track suspension system. By reducing heat, the modular rail slide described herein can be utilized without bogie wheels on the rail beam.

In some examples, rail slide embodiments described herein can improve efficiency of the track suspension system with the elimination of the bogie wheels. Further, in some examples, modular rail slide embodiments described herein can improve snowmobile speed and snowmobile fuel economy, among other benefits.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of widgets" can refer to one or more widgets. Additionally, the designator "N", as used herein, particularly with respect to reference numerals in the drawings, indicates that a number of the particular feature so designated can be included with a number of embodiments of the present disclosure.

FIG. 1 is an example of a modular rail slide 100 according to one or more embodiments of the present disclosure. FIG. 1 can represent a bottom view of a modular rail slide 100. The module rail slide 100 can include a rail base 102. The rail base 102 can include a sliding surface of the modular rail slide 100. In some examples, the rail base 102 can be a sliding surface for engaging (e.g., interacting, slidingly engaging, etc.) with an endless track of a tracked vehicle (e.g., snowmobile, etc.).

In some examples, the rail base 102 can be formed by a molding device. Previous systems could utilize a compression molding process to produce a single complete rail slide. However, compression molding processes can require a different mold to be generated for each rail slide that has a different size. The modular rail slide 100 can be a slide module of a complete modular rail slide. For example, the modular rail slide 100 can be a portion of the complete modular rail slide for use with a track suspension system.

In some examples, the rail base 102 can be small enough to allow for injection molding with an injection molding device. For example, the length of the modular rail slide 100 can be approximately 15-25 inches. In some examples, the modular rail slide can have a length of approximately 20 inches to enable an injection molding device to generate the modular rail slide 100. In some examples, the rail base 102 can have a width that is at least 1.5 inches. However, other suitable lengths and widths may be utilized in some embodiments of the present disclosure.

Injection molding can be relatively cheaper compared to compression molding. In addition, as described further herein, fewer molds can be utilized to generate the modular rail slide 100 when generating a number of different sized complete modular rail slides. In some examples, the rail base 102 can comprise a material that is different than a number of inserts 104-1. The material of the rail base 102 can include, but is not limited to: injection moldable ultra high molecular weight polyethylene (uhmw-pe), high density polyethylene (hdpe), polypropylene co-polymer, polyurethane, and/or a combination thereof.

In some examples, the modular rail slide 100 can include a number of inserts 104-1 that can be coupled to the rail base 102 via a number of grooves. For example, a number of grooves can be machined or formed into the rail base 102 to allow for inserts 104-1 to be coupled to the rail base 102. In some examples, the inserts 104-1 can be a relatively durable material. In some examples, the inserts 104-1 can provide thermal resistance, wear resistance, and/or relatively low friction.

In some examples, the inserts 104-1 can be compression molded into the rail base 102. In some examples, the inserts 104-1 can be injection molded into the rail base 102. In some examples, the material of the inserts 104-1-1 can have relative ductile properties with a relatively high pressure/velocity limit. The material of the inserts 104-1-1 can include, but are not limited to: polymide-based polymer material (e.g., DuPont Vespel® SP-21, etc.), thermoplastic material reinforced with carbon fiber/graphite/PTFE PolyEtherEtherKetone (PEEK) (e.g., Victrex® 450FC30, etc.), thermoplastic material that is not reinforced (e.g., Victrex® 450G, etc.), PolyAmide-Imides (PAIs) (e.g., Torlon® 4435, etc.), Polybenzimidazole (PBI) material (e.g., Celazole® TL-60, etc.), and/or combinations thereof.

In some embodiments, the number of inserts 104-1 can be embedded into the rail base 102. In some examples, the number of inserts 104-1 can be generated prior to generating the rail base. For example, the number of inserts 104-1 can be generated by either a compression molding process or an injection molding process. In some examples, the rail base 102 can be generated after the number of inserts 104-1. For example, rail base 102 can be generated by an injection molding process or a pouring molding process. In some examples, the number of inserts 104-1 can be loaded into a mold for the rail base 102 and the rail base can be molded with the number of inserts 104-1. That is, the rail base 102 can be molded around the number of inserts 104-1. As described further herein with reference to FIG. 6 and FIG. 7, a number of apertures can be formed into the number of inserts 104-1 and a number of nylon screws can be utilized as a locking mechanism for the number of inserts 104-1.

In some examples, the modular rail slide 100 can be an end rail of a complete modular slide rail. For example, the modular rail slide 100 can be coupled to additional modular rail slides (not shown) via a coupling end 106. The coupling end 106 can be part of a coupling system to couple two or more different modular rail slides together to form a single modular rail slide. In some examples, the coupling end 106 can be configured to allow equal spacing of a number of inserts 104-1 or insert slots between a first modular rail slide and a second modular rail slide.

In some examples, the coupling end 106 can be a molded or machined coupling end that can be coupled to a corresponding coupling end of a different modular rail slide. In some examples, the coupling end 106 can include a first notch that is 90 degrees to the rail base 102, with a slant that is 30 degrees to the rail base 102, and a second notch that is 90 degrees to the rail base 102. In some examples, the slant can be the same or similar angle as an angle of the number of inserts 104-1.

In some examples, the first notch can extend from a first edge of the rail base 102 to a first end of the number of inserts 104-1. In some examples, the slant can extend from the first end of the number of inserts 104-1 to a second end of the number of inserts 104-1. In some examples, the second notch can extend from the second end of the number of inserts 104-1 to a second edge of the rail base 102. In some examples, a corresponding coupling end 106 can have notches and slants that are opposite to the coupling end 106 to receive the coupling end 106. In this manner, two ends of different rail slide can have a mating arrangement such that they can be coupled.

For instance, in some examples, the coupling end 106 can be configured to receive a different coupling end of a different modular rail slide to maintain a distance between the number of inserts 104-1. For example, the slant of the coupling end 106 can be at the same or similar angle as the number of inserts 104-1. This can be beneficial so that the distance between the number of inserts 104-1 is maintained between the two modular rail slides. In some examples, the distance between a first insert 104-1 and a second insert 104-1 of the modular rail slide 100 can be the same as the distance between a first insert 104-1 of the modular rail slide 100 and a second insert (not shown) of a different modular rail slide that is coupled to the modular rail slide 100. In some examples, the distance can be approximately 0.2 to 0.5 inches.

In some examples, the modular rail slide 100 can include an insert 104-2. In some examples, the insert 104-2 can comprise the same or similar material as the number of inserts 104-1. In some examples, the insert 104-2 can be a single insert that extends from a first end of the modular rail slide 100 to a second end of the modular rail slide 100. In some examples, the insert 104-2 can include a plurality of inserts that are spaced along the side of the rail slide 100. In some examples, the insert 104-2 can be beneficial as it can provide wear protection and/or friction reduction on the modular rail slide 100 due to interaction with the ground and/or a belt that extends to the side of the modular rail slide 100.

In some examples, the modular rail slide 100 can include a T-slot 108 that extends on a side opposite of the number of inserts 104-1. In some examples, the T-slot 108 can be machined into the rail base 102 after the injection molding process. For instance, in some examples, the T-slot 108 can be machined into the rail base 102 based on a type of suspension system. For example, different track suspension systems can utilize a different type of T-slot configuration for a complete rail slide.

In some examples, such as that shown in FIG. 1, the modular rail slide 100 can be utilized as an end slide module with only a portion of the rail base 102 comprising the number of inserts 104-1. For example, in some embodiments, the number of inserts 104-1 can be spaced equally on a first side closer to the coupling end 106 and not have any inserts on a second side closer to the displayed T-slot 108. In some examples, the second side closer to the displayed T-slot 108 can be cut or modified to obtain a particular length when the modular rail slide 100 is coupled to additional modular rail slides.

Figure 2:
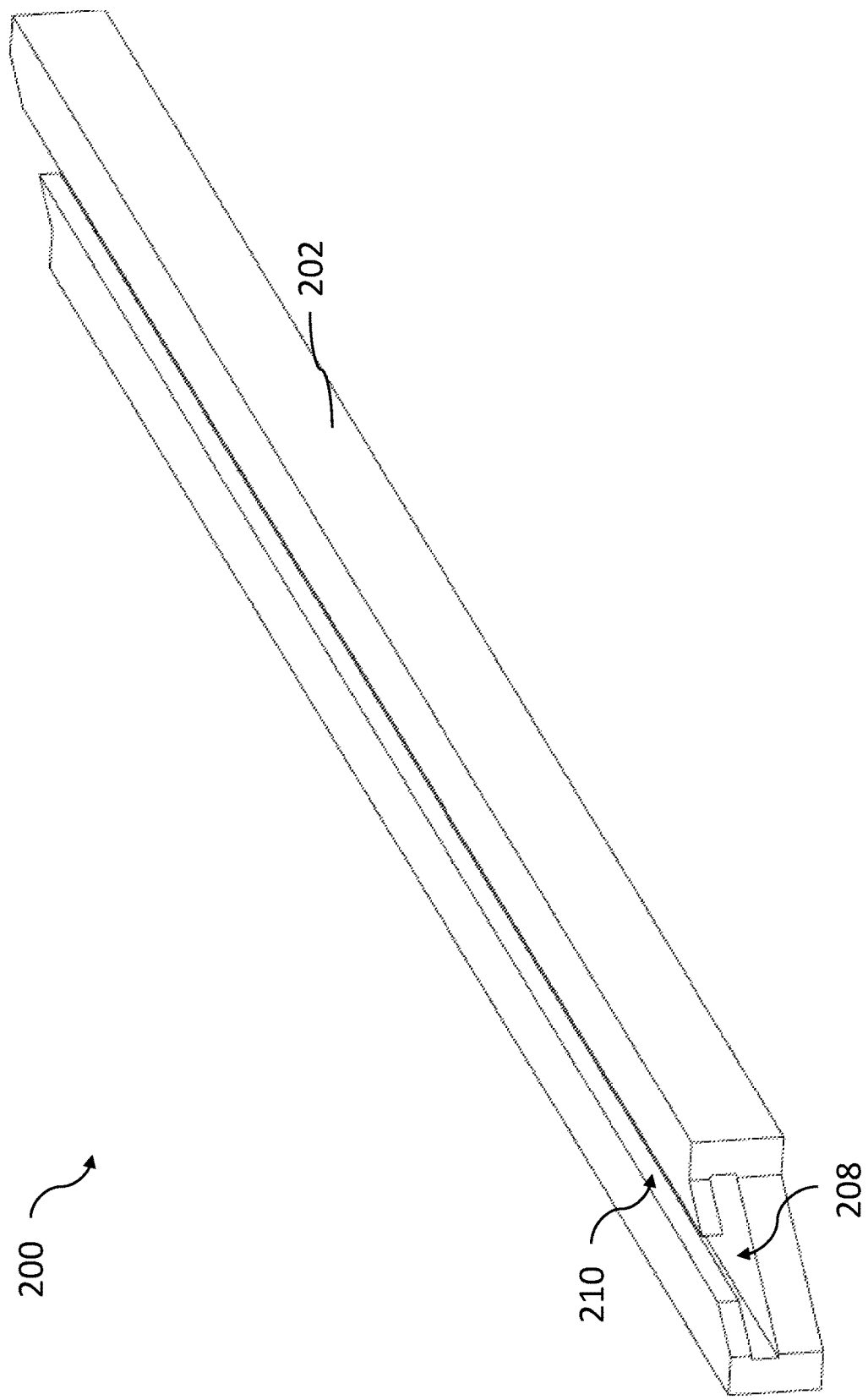
FIG. 2 is an example of a modular rail slide according to one or more embodiments of the present disclosure.

FIG. 2 is an example of a modular rail slide 200 according to one or more embodiments of the present disclosure. FIG. 2 can represent a top view of the modular rail slide 200. In some examples, the modular rail slide 200 can be a top view of modular rail slide 100 as referenced in FIG. 1.

The modular rail slide 200 can include a rail base 202. As described herein, the rail base 202 can include a T-slot 208 that can run along the top portion of the modular rail slide 200. In some examples, an opening 210 of the T-slot 208 can run along the top portion of the modular rail slide 200. In some examples, the T-slot 208 and/or opening 210 of the T-slot 208 can be machined into the rail base 202 after a molding process.

Further, in some examples, the T-slot 208 can be configured for a particular type of rail beam coupled to a rail suspension system. For instance, a rail beam of a rail suspension system can utilize different types of T-slot connectors that accept a different type of T-slot 208.

Figure 3A:
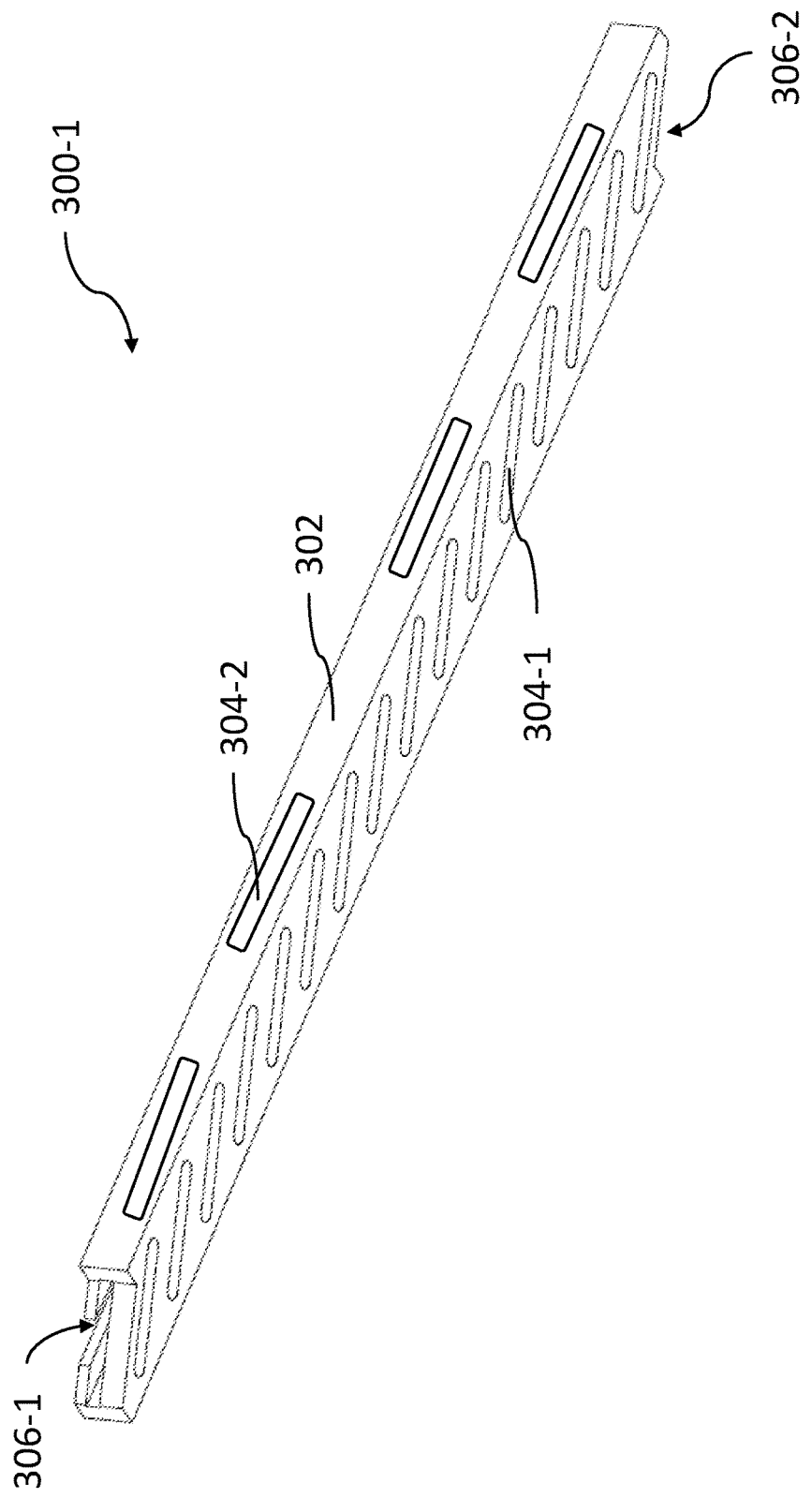
FIG. 3A is an example of a modular rail slide according to one or more embodiments of the present disclosure.

FIG. 3A is an example of a modular rail slide 300 according to one or more embodiments of the present disclosure. In some examples, the modular rail slide 300 can be a slide module. In various embodiments, the modular rail slide 300 can be an interior slide module. In some examples, the modular rail slide 300 can have two coupling ends 306-1, 306-2.

Further, in some examples, the modular rail slide 300 can include a rail base 302 that can include a number of grooves for coupling a number of inserts 304-1. As described herein, the number of inserts 304-1 can be positioned on a bottom portion of the modular rail slide 300.

In some examples, the modular rail slide 300 can include a number of inserts 304-2 on a side portion of the rail base 302. This can be beneficial in some applications, for example, where additional friction or heat is generated on the side portion of the rail base 302. In some examples, the number of inserts 304-2 can be utilized to lower the additional friction caused by a belt or ground in contact with the side portion. As described herein with reference to FIG. 1, the number of inserts 304-2 can be a single insert that extends from a first side of the modular rail slide 300 to a second side of the modular rail slide 300.

In various embodiments, each coupling end 306-1, 306-2 can be coupled to a different slide module. For example, coupling end 306-1 can be coupled to a first slide module and coupling end 306-2 can be coupled to a second slide module. In some examples, the modular rail slide 300 can be coupled to an end rail (e.g., modular rail slide 100 as referenced in FIG. 1, etc.) via at least one of the coupling ends 306-1, 306-2. In various embodiments, the modular rail slide 300 can be coupled to another interior slide module via at least one of the coupling ends 306-1, 306-2.

The modular rail slide 300 can be coupled to additional slide modules to obtain a particular length. For example, the modular rail slide 300 can be approximately 20 inches. In this example, the modular rail slide 300 can be coupled to two end slide modules via coupling end 306-1 and coupling end 306-2 respectively to obtain a length of approximately 60 inches for a complete rail slide.

Figure 3B:
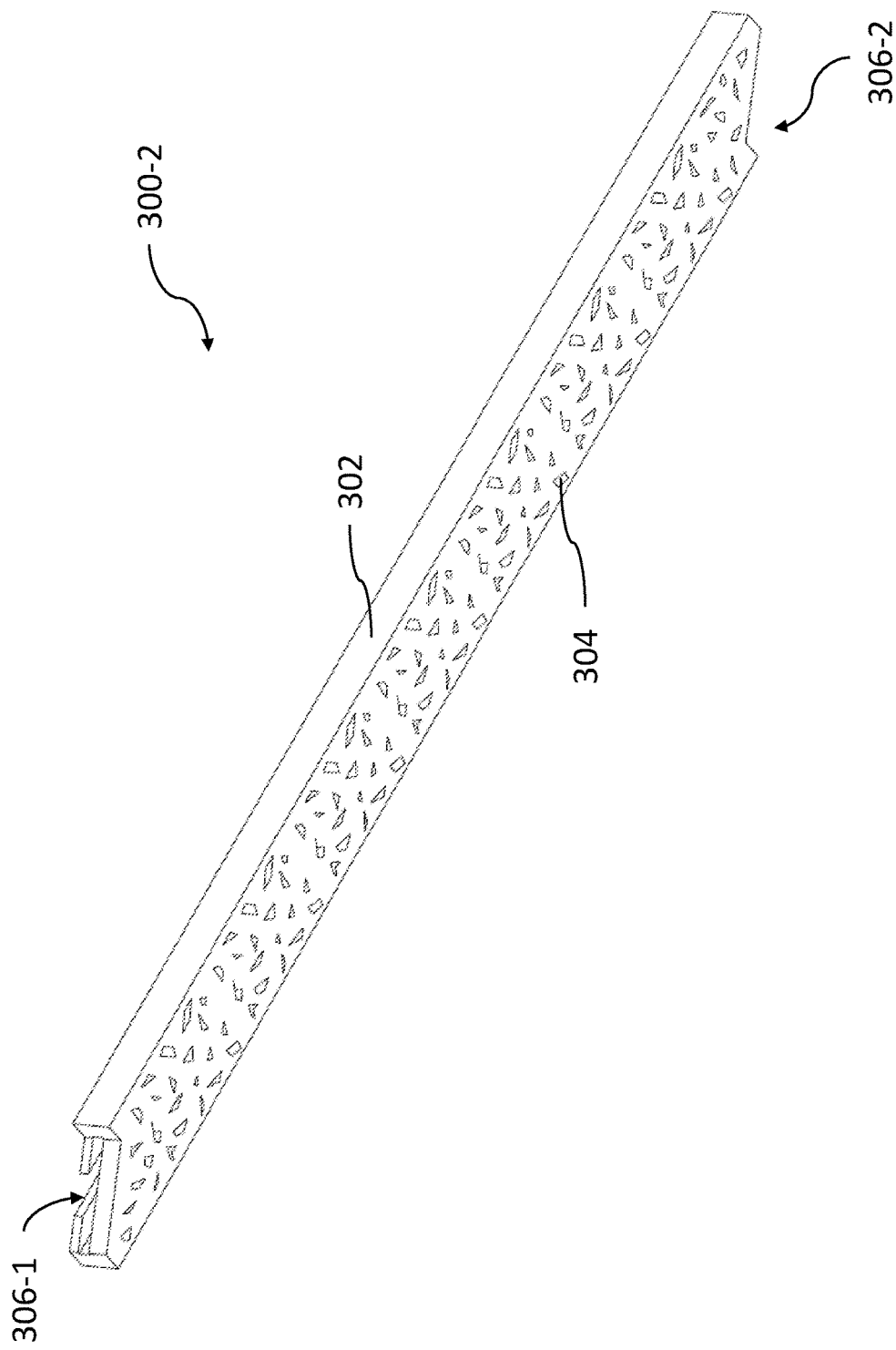
FIG. 3B is an example of a modular rail slide according to one or more embodiments of the present disclosure.

FIG. 3B is an example of a modular rail slide 300 according to one or more embodiments of the present disclosure. In some examples, the modular rail slide 300 can be a slide module. In various embodiments, the modular rail slide 300 can be an interior slide module. In some examples, the modular rail slide 300 can have two coupling ends 306-1, 306-2.

Further, in some embodiments, the modular rail slide 300 can include a rail base 302 that can include a plurality of insert pieces 304. In some embodiments, the plurality of insert pieces 304 can be embedded into the rail base 302. As described herein, the plurality of insert pieces 304 can be positioned on a bottom portion of the modular rail slide 300. In some embodiments, the plurality of insert pieces 304 can be positioned across the bottom portion of the modular rail slide 300. In some examples, the plurality of insert pieces can be molded into the bottom portion of the modular rail slide 300 as described herein.

In some examples, the insert pieces 304 can be a relatively durable material. In some examples, the insert pieces 304 can provide thermal resistance, wear resistance, and/or relatively low friction. In various embodiments, the insert pieces 304 can be molded into the rail base. For example, the insert pieces 304 can be compression molded or molded by pouring a base material (e.g., polyurethane) into a mold.

In some embodiments, the insert pieces 304 can be injection molded into the rail base. In some examples, the material of the insert pieces 304 can have relative ductile properties with a relatively high pressure/velocity limit. Suitable materials for the insert pieces 304 can include, but are not limited to: polymide-based polymer material (e.g., DuPont Vespel® SP-21, etc.), thermoplastic material reinforced with carbon fiber/graphite/PTFE PolyEtherEtherKetone (PEEK) (e.g., Victrex® 450FC30, etc.), thermoplastic material that is not reinforced (e.g., Victrex® 450G, etc.), PolyAmide-Imides (PAIs) (e.g., Torlon® 4435, etc.), Polybenzimidazole (PBI) material (e.g., Celazole® TL-60, etc.), and/or combinations thereof.

Positioning the insert pieces 304 across the bottom portion of the rail slide 300 can include positioning a plurality of insert pieces 304 in a non-uniform manner across the bottom portion of the rail slide 300. In some embodiments, the non-uniform insert pieces 304 can provide similar function as the number of spaced inserts 304-1 as referenced in FIG. 3A.

Figure 4:
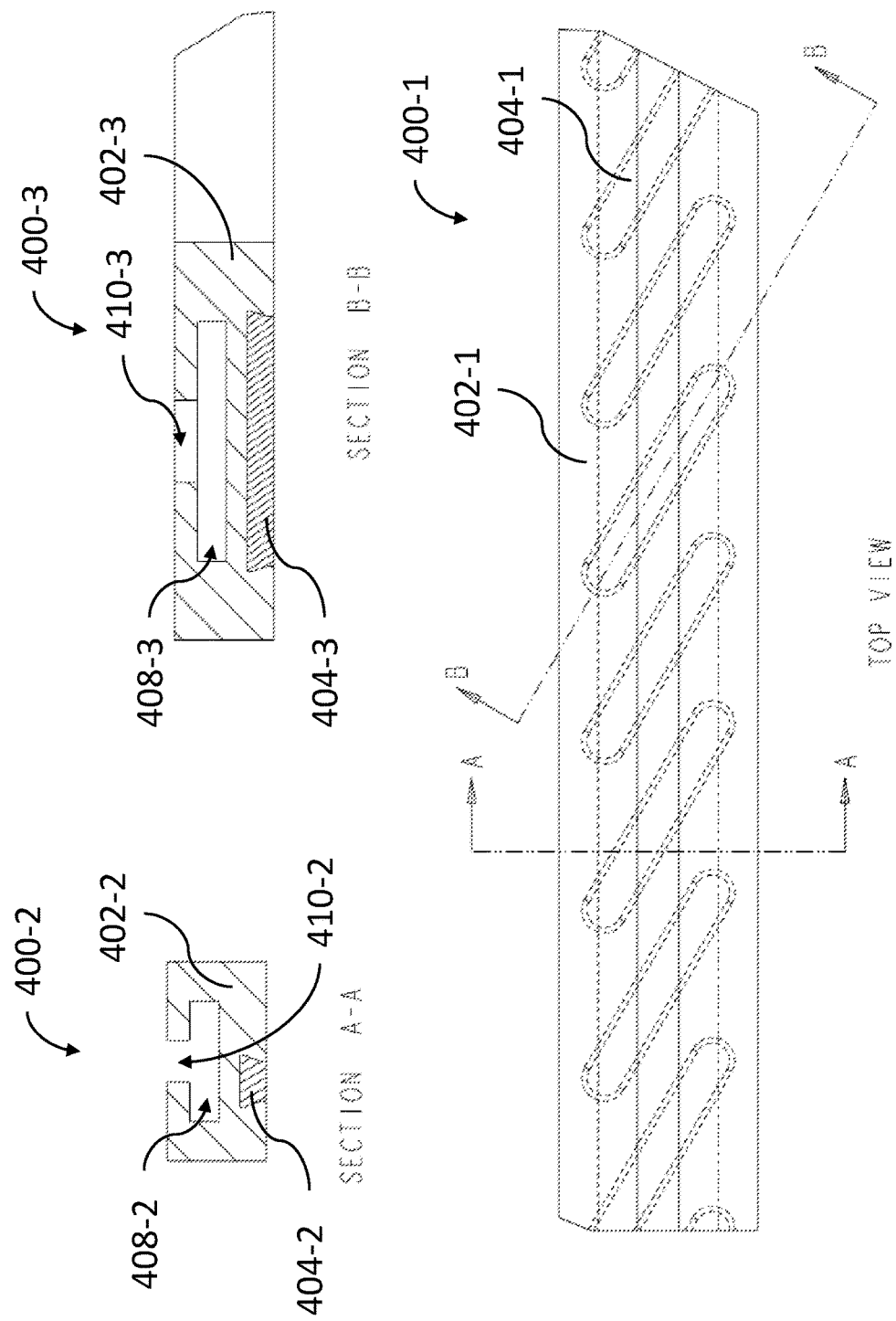
FIG. 4 is an example of a modular rail slide according to one or more embodiments of the present disclosure.

FIG. 4 is an example of a modular rail slide 400-1 according to one or more embodiments of the present disclosure. FIG. 4 can represent a modular rail slide 400-1 with a first cross-sectional view 400-2 and a second cross-sectional view 400-3.

In some examples, the first cross-sectional view 400-2 can represent a 90 degree cross-sectional view of the modular rail slide 400-1. That is, cross-sectional view 400-2 can be formed from cutting the modular rail slide 400-1 at approximately a 90 degree angle to the modular rail slide 400-1. In some examples, the second cross-sectional view 400-3 can represent a 30 degree cross-sectional view. That is, cross-sectional view 400-3 can be formed from cutting the modular rail slide 400-1 at approximately a 30 degree angle to the modular rail slide 400-1.

As described herein, the modular rail slide 400-1 can include a rail base 402-1. In some examples, the rail base 402-1 can comprise the same or similar material as the rail base 102 referenced in FIG. 1. In addition, the modular rail slide 400-1 can include a number of inserts 404-1. In some examples, the number of inserts 404-1 can comprise the same or similar material as the number of inserts 104-1 as referenced in FIG. 1.

In various embodiments, as shown in FIG. 4, the first cross-sectional view 400-2 can represent the T-slot 408-2 and opening 410-2 of the rail base 402-2. As described herein, the T-slot 408-2 and opening 410-2 can be configured to receive a particular rail beam of a rail suspension system. In some examples, the first cross-sectional view 400-2 can represent a portion of the number of inserts 404-2.

In some examples, the second cross-sectional view 400-3 can represent the T-slot 408-3 and opening 410-3 of the rail base 402-3. As described herein, the T-slot 408-3 and opening 410-3 can be configured to receive a particular rail beam of a rail suspension system. In some embodiments, the second cross-sectional view 400-3 can represent a portion of the number of inserts 404-3.

In some examples, the cross-sectional view 400-3 can represent a cross-sectional view that is cut at the same or similar angle as the number of inserts 404-3. For example, when the number of inserts 404-1 are aligned at an angle of approximately 30 degrees to the rail base 402-1, then the second cross-sectional view 400-3 can be cut along the number of inserts 404-1 at an angle of approximately 30 degrees to the rail base 402-1.

Figure 5A:
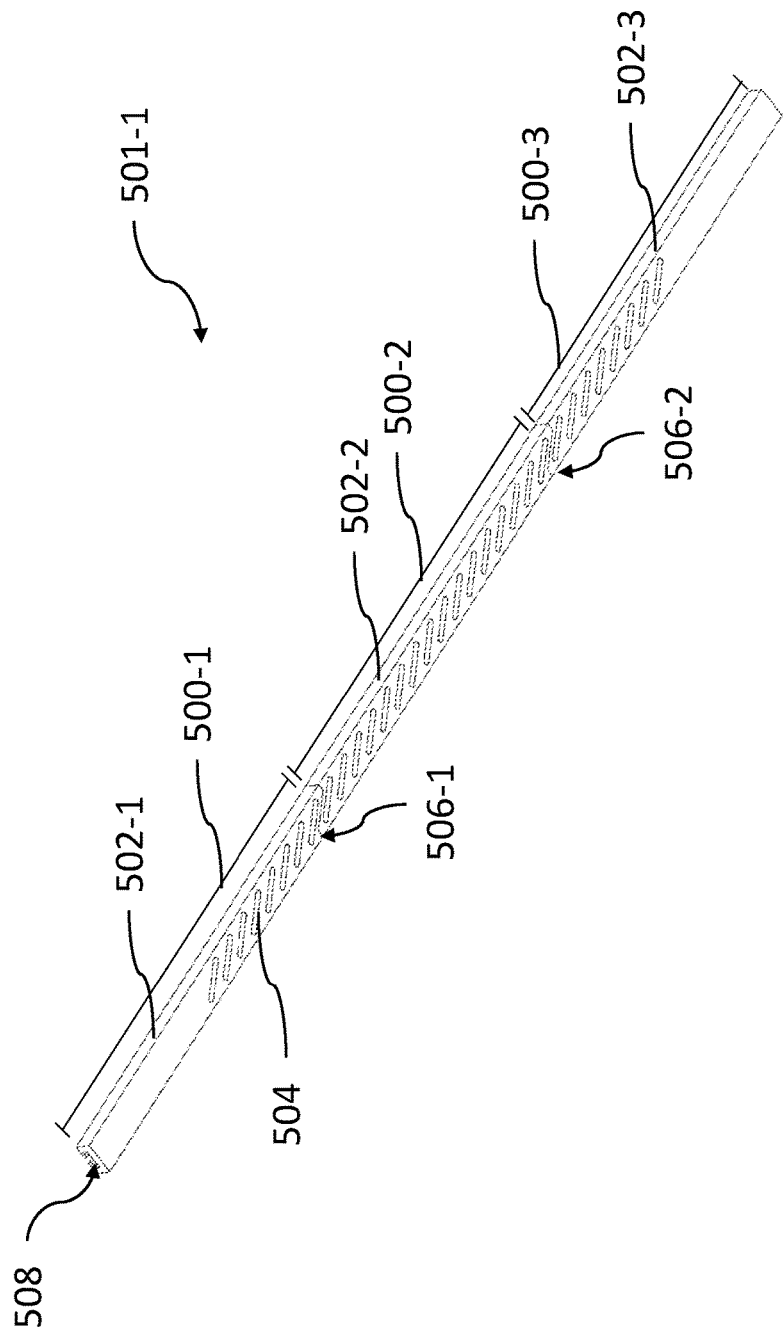
FIG. 5A is an example of a modular rail slide according to one or more embodiments of the present disclosure.

FIG. 5A is an example of a modular rail slide 501 according to one or more embodiments of the present disclosure. In some examples, the modular rail slide 501 can be a complete modular rail slide. In some examples, the modular rail slide 501 can include a number of slide modules 500-1, 500-2, 500-3 (e.g., slide module segments, such as modular rail slide 100 as referenced in FIG. 1, modular rail slide 300 as referenced in FIG. 3, etc.).

The modular rail slide 501 can, for example, include a first slide module 500-1, a second slide module 500-2, and a third slide module 500-3. In some examples, the number of slide modules 500-1, 500-2, 500-3 can each be a modular rail slide as described herein with a number of inserts 504 coupled to each of the number of rail bases 502-1, 502-2, 502-3 of the slide modules 500-1, 500-2, 500-3.

In various embodiments, the number of slide modules 500-1, 500-2, 500-3 can be coupled together by a number of coupling ends 506-1, 506-2. For example, a first slide module 500-1 can be coupled to a second slide module 500-2 via a coupling end 506-1. As can be seen in the embodiment of FIG. 5, a second slide module 500-2 can be coupled to a third slide module 500-3 via coupling end 506-2.

In some examples, each of the number of slide modules 500-1, 500-2, 500-3 can be slid onto a rail beam via a T-slot 508, for example, via a corresponding T-slot connector of the rail beam or via another connecting mechanism. In these examples, each of the number of slide modules 500-1, 500-2, 500-3 can be slid up against each other so that slide module 500-1 is physically touching slide module 500-2 and so that slide module 500-2 is physically touching slide module 500-3. In some examples, no mechanical coupling is utilized to couple the number of slide modules 500-1, 500-2, 500-3 together.

As used herein, coupling a first slide module to a second slide module can include placing the first slide module next to the second slide module so that the first slide module is physically touching the second slide module. In some examples, coupling a first slide module to a second slide module can include mechanically coupling the first slide module to the second slide module. In these examples, a number of mounting devices can be utilized to mechanically couple the first slide module to the second slide module. For instance, coupling a first slide module to a second slide module can include mechanically coupling the first slide module to a rail beam and coupling the second slide module to the rail beam when the first slide module and the second slide module are physically touching each other.

In some examples, the coupling ends 506-1, 506-2 can include a coupling end at each end of the number of slide modules 500-1, 500-2, 500-3. For example, slide module 500-1 can include a coupling end 506-1 that is coupled to a corresponding coupling end 506-1 of slide module 500-2. In various embodiments, the coupling ends 506-1, 506-2 can be molded or machined for each of the number of slide modules 500-1, 500-2, 500-3.

The coupling ends 506-1, 506-2 can be configured to maintain a distance between the number of inserts 504 between the coupled slide modules 500-1, 500-2, 500-3, in some embodiments. For example, the distance between the number of inserts 504 can be the same distance from a first slide module 500-1 and a second slide module 500-2.

In some examples, the distance between the number of inserts 504 can be between approximately 0.2 inches and approximately 0.5 inches. In some specific embodiments, the distance between the number of inserts 504 can, for example, be approximately 0.375 inches.

The distance between the number of inserts 504 can, for example, be maintained through the coupling ends 506-1, 506-2. That is, the distance between the number of inserts 504 can be maintained across the number of slide modules 500-1, 500-2, 500-3.

Figure 5B:
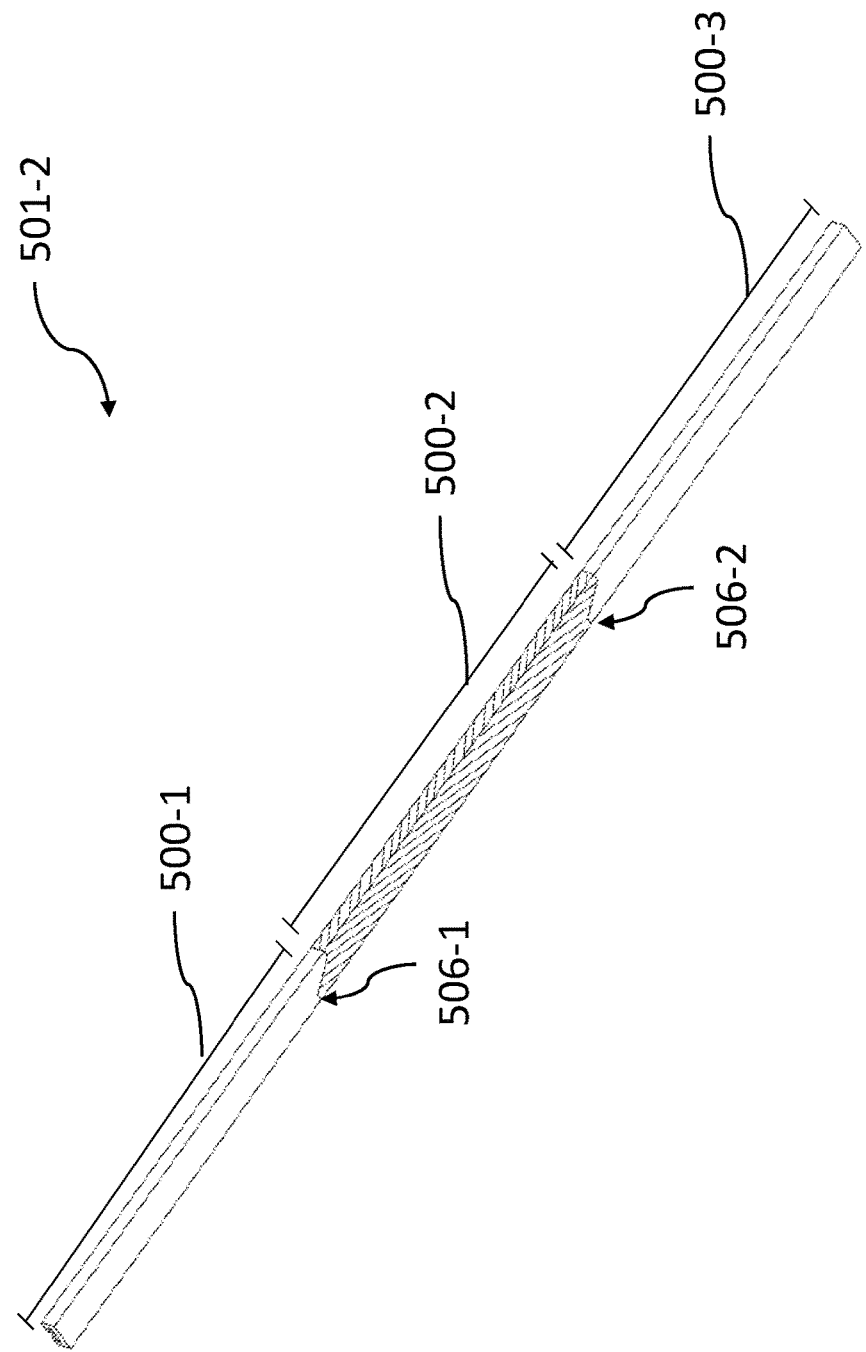
FIG. 5B is an example of a modular rail slide according to one or more embodiments of the present disclosure.

FIG. 5B is an example of a modular rail slide 501 according to one or more embodiments of the present disclosure. In some examples, the modular rail slide 501 can include multiple different types of slide modules 500-1, 500-2, 500-3. For example, the modular rail slide 501 can include a first slide module 500-1 comprising a first type of slide module, a second slide module 500-2 comprising a second type of slide module, and a third slide module 500-3 comprising a third type of slide module.

The different types of slide modules 500-1, 500-2, 500-3 can be different embodiments of the slide modules described herein. For example, a slide module 100 as referenced in FIG. 1 can be a first type of slide module that includes a number of inserts that are evenly spaced across the bottom side of the slide module 100. In another example, the slide module 300 as referenced in FIG. 3 can be a second type of slide module that includes a number of insert pieces that are spaced in a non-uniform pattern across the bottom side of the slide module 300. Thus, different types of slide modules can include different slide module embodiments described herein and/or different slide module combinations of slide module embodiments described herein.

In some embodiments, one of the different types of slide modules 500-1, 500-2, 500-3 can include a slide module that is molded from an insert material. That is, in some embodiments, a type of slide module can include a slide module that is molded partially or completely with an insert material. For example, as described herein, the insert material that is utilized to form the slide module can include, but is not limited to: polymide-based polymer material (e.g., DuPont Vespel® SP-21, etc.), thermoplastic material reinforced with carbon fiber/graphite/PTFE PolyEtherEtherKetone (PEEK) (e.g., Victrex® 450FC30, etc.), thermoplastic material that is not reinforced (e.g., Victrex® 450G, etc.), PolyAmide-Imides (PAIs) (e.g., Torlon® 4435, etc.), Polybenzimidazole (PBI) material (e.g., Celazole® TL-60, etc.), and/or combinations thereof.

In one embodiment, the first slide module 500-1 can be a slide module similar to slide module 100 as referenced in FIG. 1. That is, the first slide module 500-1 can be a slide with a number of slide inserts that are spaced substantially evenly across a bottom side of the slide module 500-1. In this embodiment, the second slide module 500-2 can be a slide module molded from an insert material as described herein. Furthermore, in this embodiment, the third slide module 500-3 can be a slide module similar to slide module 300 as referenced in FIG. 3B. That is, the third slide module 500-3 can be a slide with a plurality of slide pieces distributed across the bottom portion of the slide module 500-3.

In some examples, the coupling ends 506-1, 506-2 can include a coupling end at each end of the number of slide modules 500-1, 500-2, 500-3. For example, slide module 500-1 can include a coupling end 506-1 that is coupled to a corresponding coupling end 506-1 of slide module 500-2. In various embodiments, the coupling ends 506-1, 506-2 can be molded or machined for each of the number of slide modules 500-1, 500-2, 500-3.

In some examples, the modular rail slide 501 can be configured with a number of different configurations with different types of slide modules for each of the slide modules 500-1, 500-2, 500-3. In some embodiments, the modular rail slide 501 can be configured based on friction data associated with a particular rail suspension system. For example, a slide module 500-2 can have relatively less friction compared to slide module 500-3 when utilized with a particular rail suspension system. In this example, the slide module 500-2 can include less inserts or insert material compared to the slide module 500-3. This example can lower a cost of the modular rail slide 501 without sacrificing performance of the modular rail slide 501.

Figure 5C:
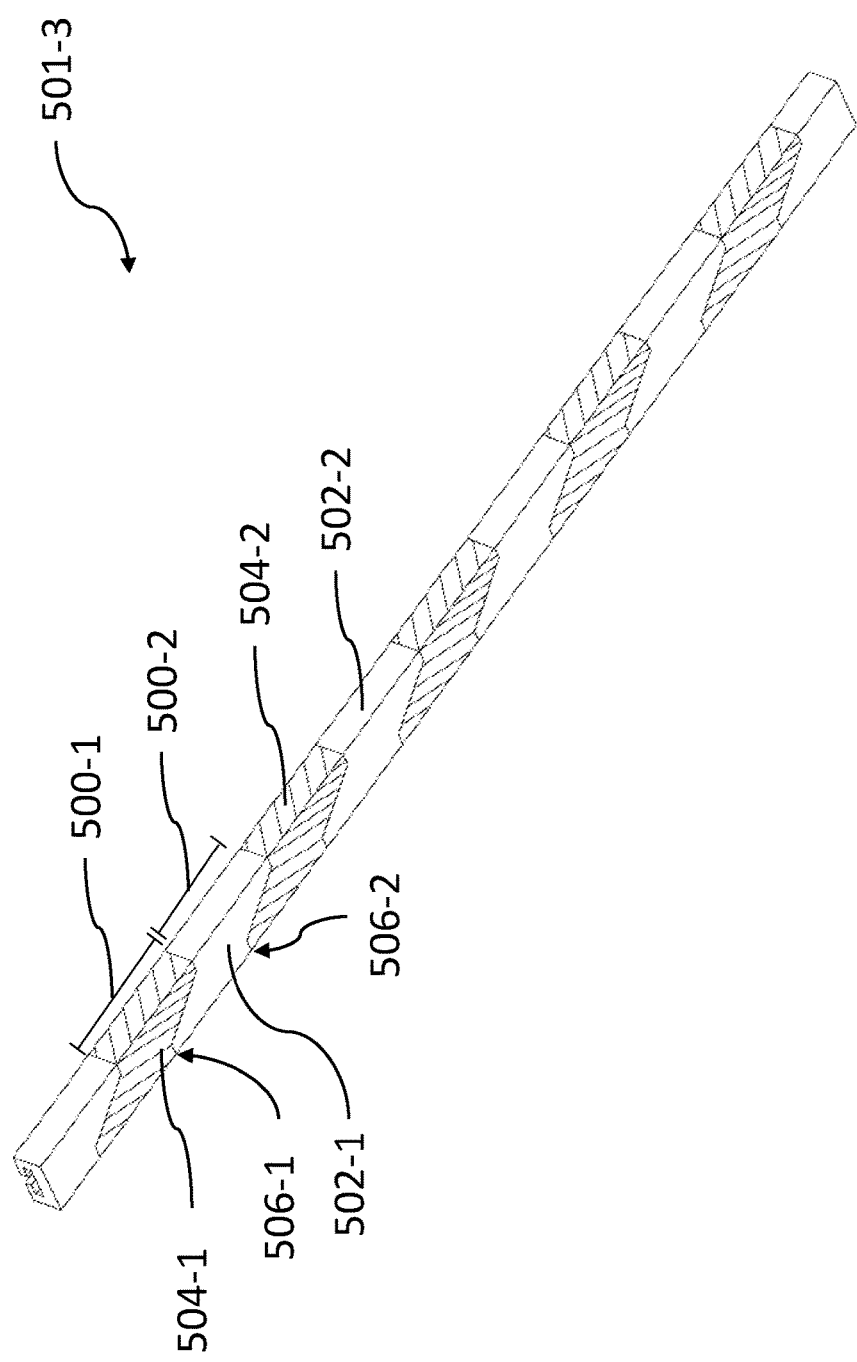
FIG. 5C is an example of a modular rail slide according to one or more embodiments of the present disclosure.

FIG. 5C is an example of a modular rail slide 501 according to one or more embodiments of the present disclosure. The modular rail slide 501 can be similar to the modular rail slide 501 as referenced in FIG. 5A and FIG. 5B. However, the modular rail slide 501 as illustrated in FIG. 5C can include a greater quantity of slide modules 500-1, 500-2 to form the same or similarly sized modular rail slide 501. Thus, the slide modules 500-1, 500-2 can have a relatively shorter length compared to the slide modules 500-1, 500-2, 500-3 as referenced in FIG. 5A and FIG. 5B.

In some embodiments, the modular rail slide 501 can include alternating slide modules 500-1, 500-2 where slide module 500-1 is a first type of slide module and slide module 500-2 is a second type of slide module. In one example, the slide module 500-1 can comprise an insert material 504-1. For example, slide module 500-1 can be molded with the insert material 504-1. For example, as described herein, the insert material 504-1, 504-2 that is utilized to form the slide module can include, but is not limited to: polymide-based polymer material (e.g., DuPont Vespel® SP-21, etc.), thermoplastic material reinforced with carbon fiber/graphite/PTFE PolyEtherEtherKetone (PEEK) (e.g., Victrex® 450FC30, etc.), thermoplastic material that is not reinforced (e.g., Victrex® 450G, etc.), PolyAmide-Imides (PAIs) (e.g., Torlon® 4435, etc.), Polybenzimidazole (PBI) material (e.g., Celazole® TL-60, etc.), and/or combinations thereof.

In another example, the slide module 500-2 can comprise a base material 502-1. For example, the slide module 500-2 can be molded with a base material 502-1. The base material 502-1, 502-2 can include, but is not limited to: injection moldable ultra high molecular weight polyethylene (uhmw-pe), high density polyethylene (hdpe), polypropylene co-polymer, polyurethane, and/or a combination thereof.

In some examples, the coupling ends 506-1, 506-2 can include a coupling end at each end of the number of slide modules 500-1, 500-2. For example, slide module 500-1 can include a coupling end 506-1 that is coupled to a corresponding coupling end 506-1 of slide module 500-2. In various embodiments, the coupling ends 506-1, 506-2 can be molded or machined for each of the number of slide modules 500-1, 500-2.

In some embodiments, the relatively shorter slide modules can be utilized to provide alternating types of slide modules 500-1, 500-2 across the modular rail slide 501. For example, the slide modules 500-1, 500-2 can alternate from a first insert material 504-1 slide module, to a first base material 502-1 slide module, to a second insert material 504-2 slide module, to a second base material 502-2 slide module. In some examples, the base material 502-1, 502-2 slide modules can include a number of inserts or insert embedded insert material as described herein.

Figure 6:
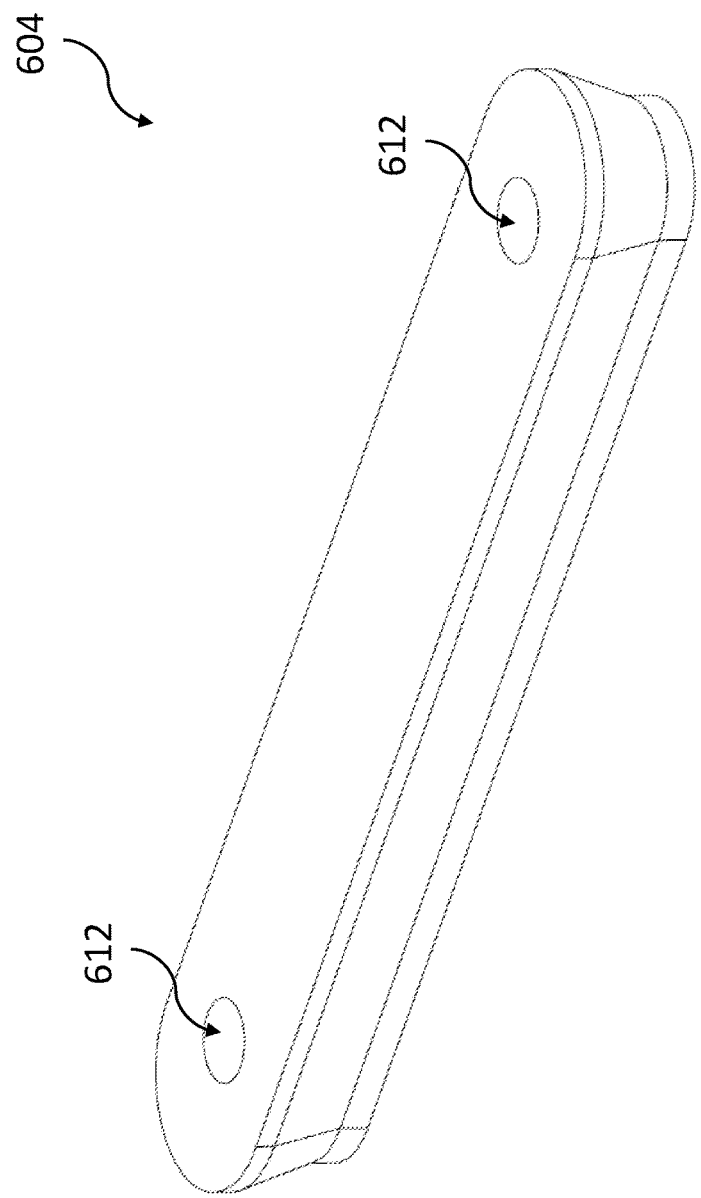
FIG. 6 is an example of an insert according to one or more embodiments of the present disclosure.

FIG. 6 is an example of an insert 604 according to one or more embodiments of the present disclosure. In some examples, the insert 604 can be formed or positioned within a number of grooves of a rail base. As described herein, the insert 604 can be beneficial as it can lower friction and/or heat produced by a track suspension utilizing a slide module, as described in the embodiments herein.

As described herein, the insert 604 can comprise an insert material. In some examples, the insert 604 can be a relatively durable material. In some examples, the insert 604 can provide thermal resistance, wear resistance, and/or relatively low friction. In various embodiments, the insert 604 can be compression molded into the rail base.

In some embodiments, the insert 604 can be injection molded into the rail base. In some examples, the material of the insert 604 can have relative ductile properties with a relatively high pressure/velocity limit. Suitable materials for the insert 604 can include, but are not limited to: polymide-based polymer material (e.g., DuPont Vespel® SP-21, etc.), thermoplastic material reinforced with carbon fiber/graphite/PTFE PolyEtherEtherKetone (PEEK) (e.g., Victrex® 450FC30, etc.), thermoplastic material that is not reinforced (e.g., Victrex® 450G, etc.), PolyAmide-Imides (PAIs) (e.g., Torlon® 4435, etc.), Polybenzimidazole (PBI) material (e.g., Celazole® TL-60, etc.), and/or combinations thereof.

As shown in the embodiment of FIG. 6, the insert 604 can include a number of apertures 612. The number of apertures 612 can, for example, extend through the insert 604. In some embodiments, the number of apertures 612 can be utilized to mechanically fix the insert 604 into a groove of a rail base. For example, the number of apertures 612 can be utilized to fix the insert 604 to the rail base via a number of mounting screws or other suitable mechanical connection elements.

Figure 7:
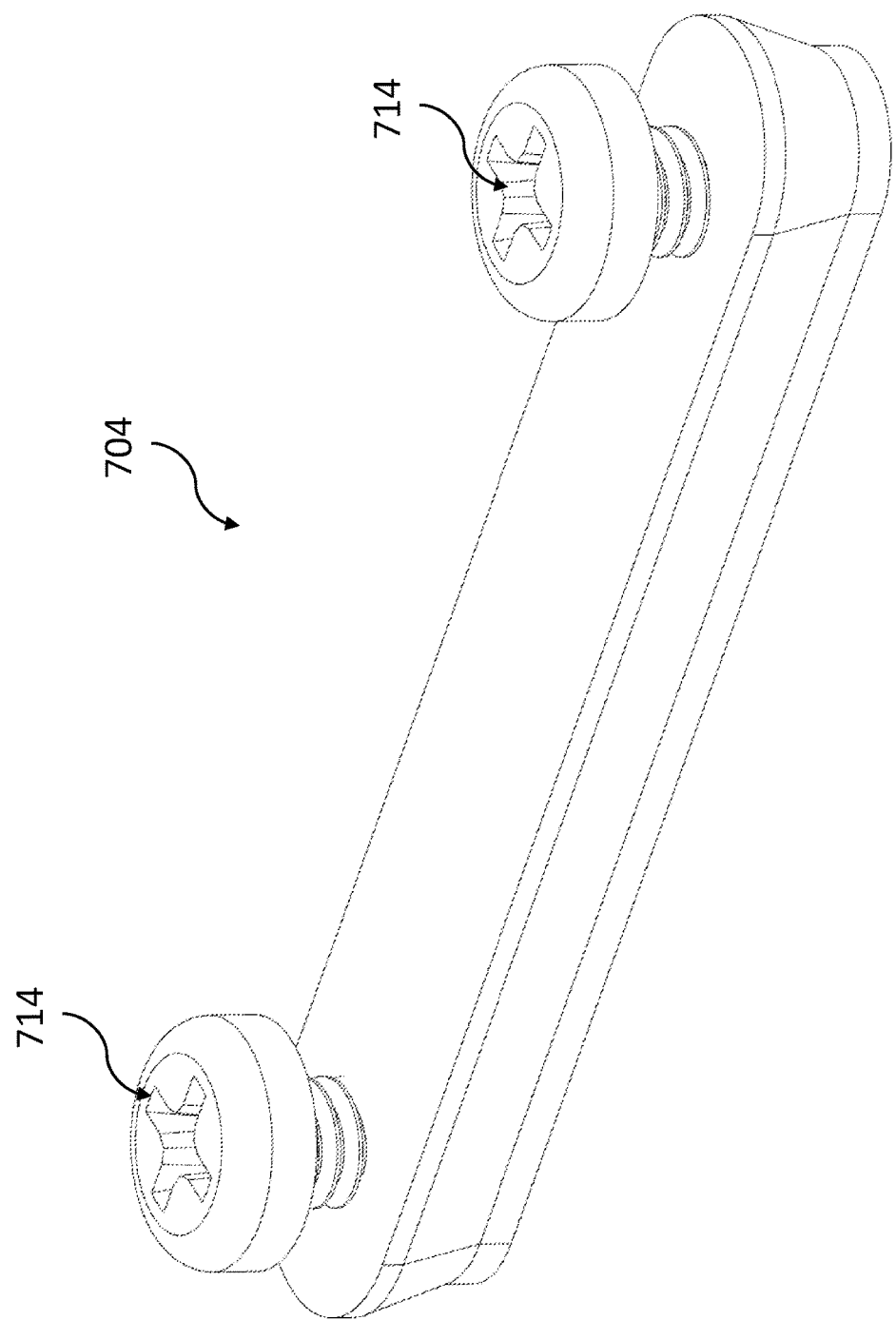
FIG. 7 is an example of an insert according to one or more embodiments of the present disclosure.

FIG. 7 is an example of an insert 704 according to one or more embodiments of the present disclosure. In some examples, the insert 704 can be the same or similar to insert 604 as referenced in FIG. 6. In various embodiments, the insert 704 can be formed within a number of grooves of a rail base. As described herein, the insert 704 can lower friction and/or heat produced by a track suspension utilizing a slide module, as described in the embodiments herein.

In some examples, the insert 704 can include a number of apertures. For instance, a number of apertures can be utilized to lock the insert 704 into a groove of a rail base. For example, the number of apertures can be utilized to lock the insert 704 to the rail base via a number of mounting screws 714.

In various embodiments, the number of mounting screws 714 can pass through the apertures of the insert 704 and couple to the rail base to mechanically fix the insert 704 to the rail base. In some examples, the number of mounting screws 714 can be heat resistance and/or friction resistance mounting screws. For example, the number of mounting screws 714 can be nylon mounting screws or made from other suitable heat or friction resistant materials.

Figure 8:
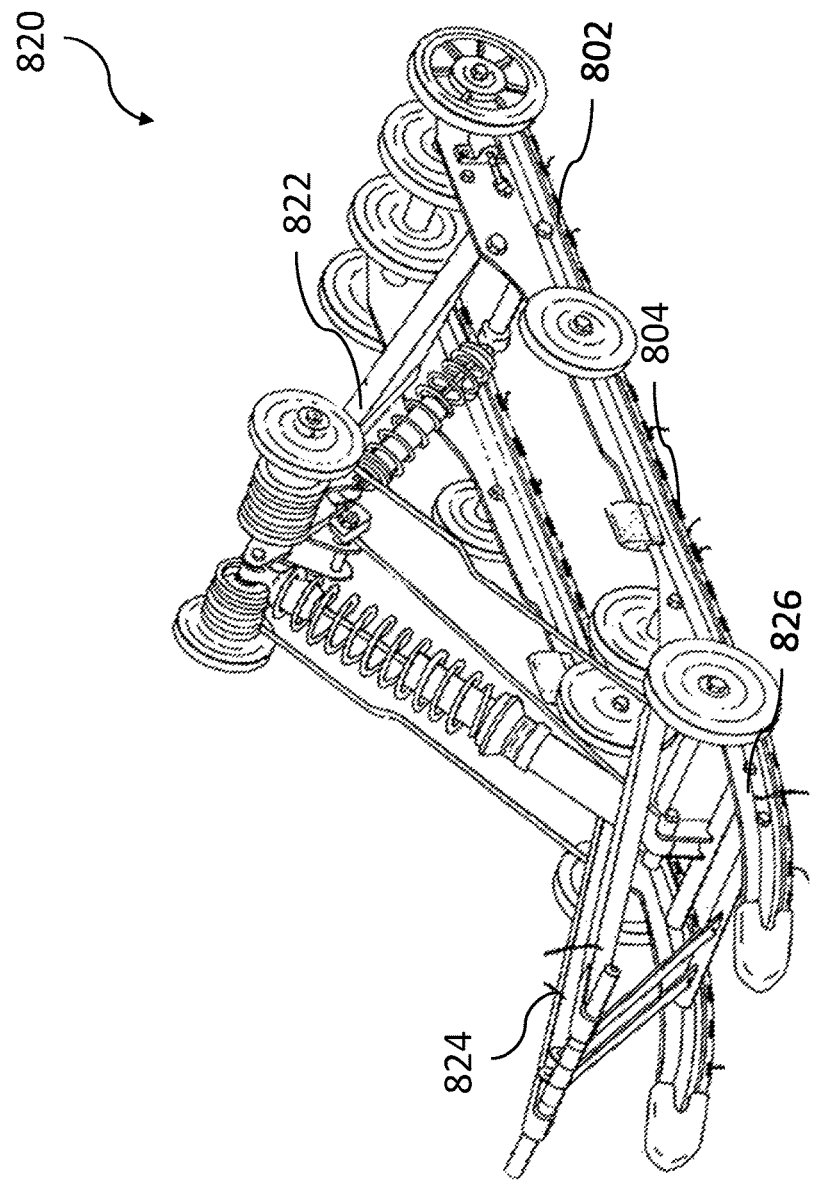
FIG. 8 is an example of a system for a modular rail slide according to one or more embodiments of the present disclosure.

FIG. 8 is an example of a system 820 for a modular rail slide according to one or more embodiments of the present disclosure. The system 820 can represent a track suspension system. In some examples, the track suspension system can be utilized on a snowmobile or other vehicle that utilizes a track to propel the vehicle.

In some examples, the system 820 can include a front suspension arm 824. The front suspension arm 824 can extend downwardly from a pivotal connection to a chassis of the system 820. In some examples, the system 820 can include a rear suspension arm 822. The rear suspension arm 822 can extend downwardly from the pivotal connection to the chassis of the system 820.

In some examples, the system 820 can include a rail beam 826. The rail beam 826 can extend from a front portion of the system 820 to a back portion of the system 820.

In some applications, a complete modular rail slide can be coupled to the rail beam 826 of the system 820. As described herein, the complete modular rail slide can comprise multiple slide modules that are coupled together to form the complete modular rail. As described herein, the complete modular rail slide can include a rail base 802 that extends from the front of the system 820 to the back of the system 820.

As shown in the example of FIG. 8, the rail base 802 can include a number of grooves that include a number of inserts 804. And, as described herein, the number of inserts 804 can be spaced equally across the complete modular rail slide.

Figure 9:
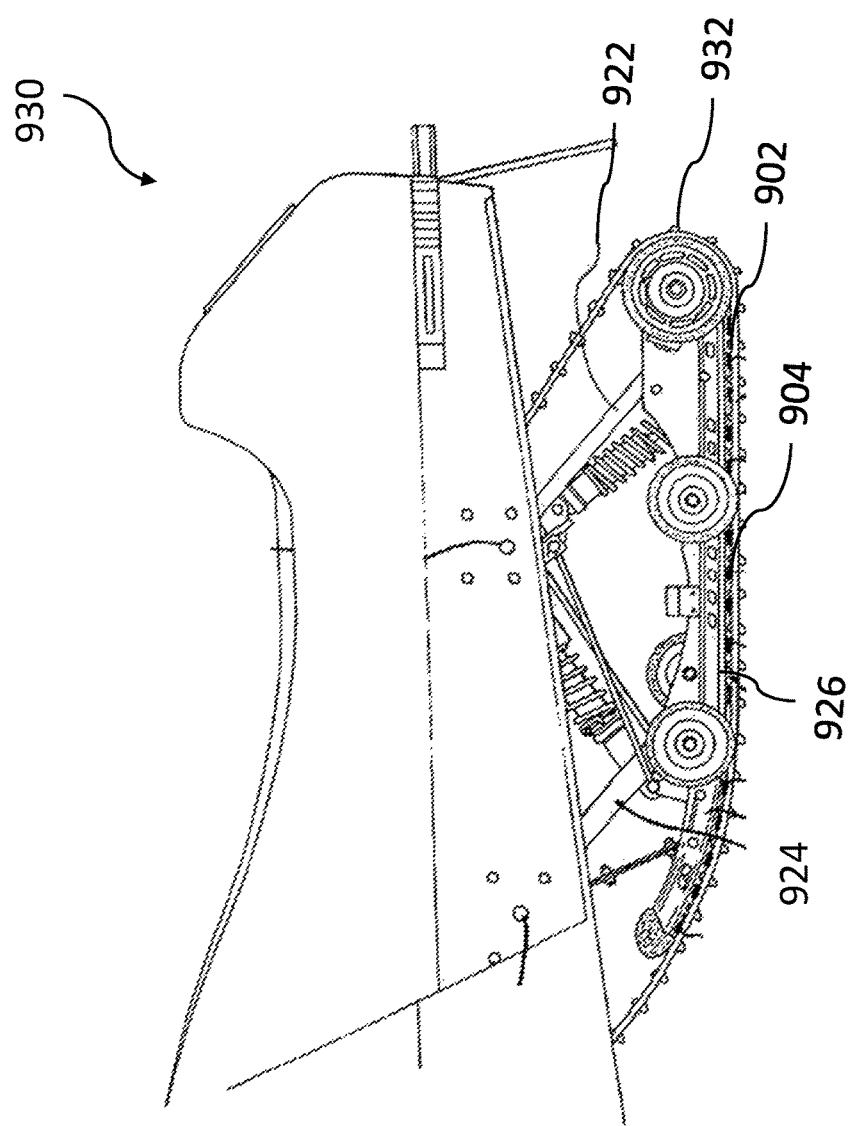
FIG. 9 is an example of a system for a modular rail slide according to one or more embodiments of the present disclosure.

FIG. 9 is an example of a system 930 for a modular rail slide according to one or more embodiments of the present disclosure. The system 930 can represent a snowmobile that utilizes a system 820, as referenced in FIG. 8. In some examples, the system 930 can include a rail beam 926. The rail beam 926 can extend from a front portion of the system 930 to a back portion of the system 930.

As described herein, the system 930 can include a front suspension arm 924 and a rear suspension arm 922 that can be coupled to a pivotal connection and coupled to a chassis of the system 930. As described herein, a complete modular rail slide can extend from a front portion of the system 930 to a back portion of the system 930. In some examples as discussed herein, the complete modular rail slide can include a number of slide modules coupled together to form the complete modular rail slide. The complete modular rail slide can, for example, include a rail base 902 with a number of inserts 904 coupled to grooves within the rail base 902.

In some examples, the system 930 can include a belt 932. The belt 932 can be utilized to propel the system 930. In some examples, the belt 932 can pass under the complete modular rail slide.

Figure 10:
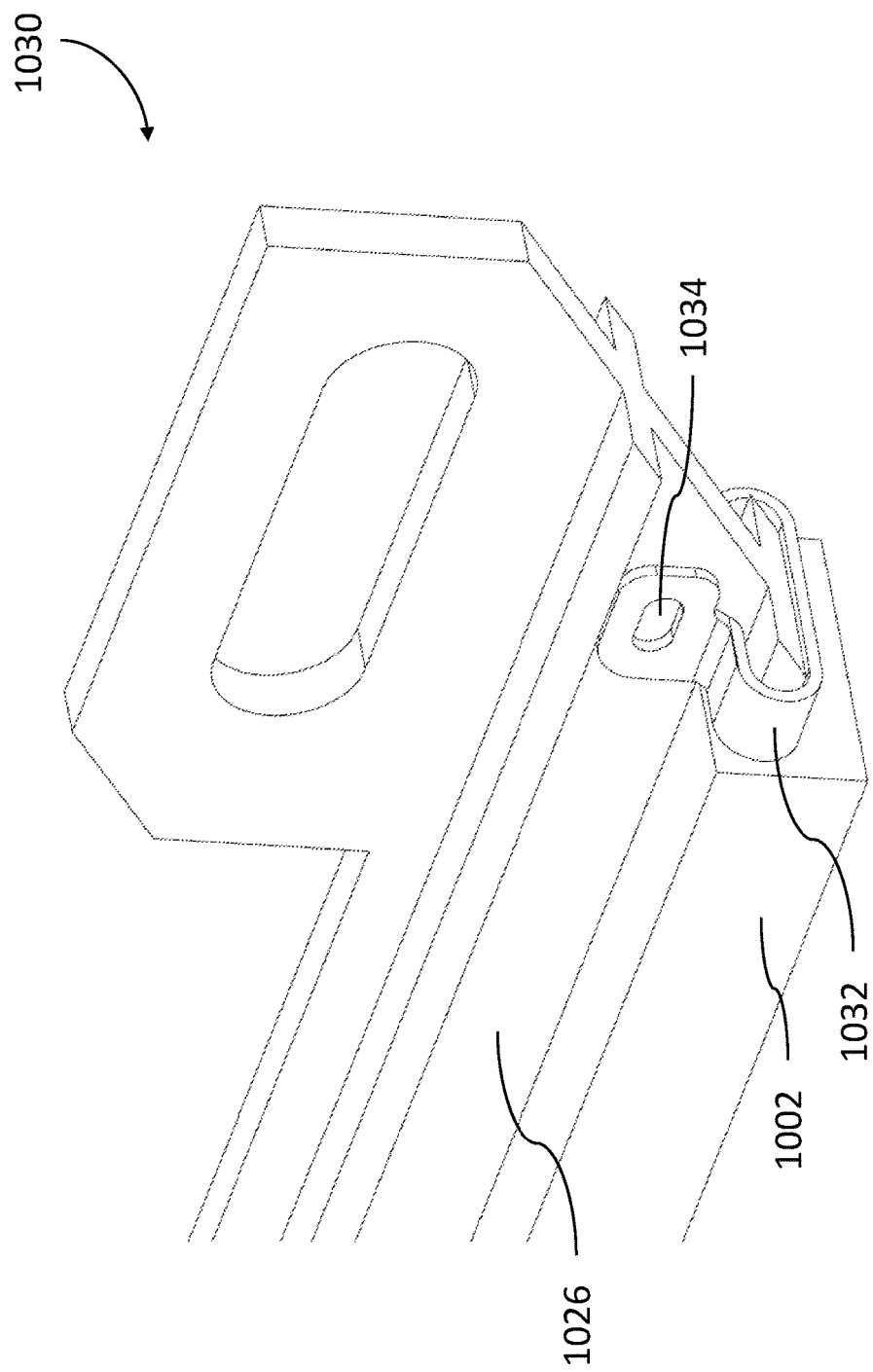
FIG. 10 is an example of a system for a modular rail slide according to one or more embodiments of the present disclosure.

FIG. 10 is an example of a system 1030 for a modular rail slide according to one or more embodiments of the present disclosure. In some examples, the system 1030 can be utilized to prevent a rail base 1002 from sliding off of a rail beam 1026 of a track suspension system as described herein.

In previous systems and methods a rail slide can be mechanically attached to the rail beam 1026 at a front portion of the rail beam 1026. These previous systems and methods may not utilize a clip 1032 to prevent the rail base 1002 from sliding off of the rail beam 1026, since previous systems and methods utilized a singular piece for a rail slide compared to a modular rail slide, as described herein.

In some embodiments of the present disclosure, the system 1030 can include a clip 1032 that can be coupled to the rail beam 1026 to prevent the rail base 1002 of the modular rail slide from sliding off of the T-slot of the rail beam 1026. In some examples, the clip 1032 can be mechanically attached to the rail beam 1026 via an aperture 1034. For example, a mounting screw or mounting pin can be utilized to mechanically attach the clip 1032 to the rail beam 1026.

As discussed above, the rail slide modules of a modular rail slide may not be mechanically attached together. In such embodiments, the clip 1032 can prevent the rail slide modules from sliding apart and/or from sliding off of the rail beam 1026.

As described herein, the number of inserts in the rail base 1002 can be separated by an equal distance when the number of rail slide modules are coupled together. In some examples, preventing the slide modules from sliding apart can maintain the equal distance between the number of inserts between each of the rail slide modules.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A modular rail slide, comprising:
  a first slide module comprising first inserts coupled to the first slide module and a first coupling end on a first end of the first slide module; and
  a second slide module comprising second inserts coupled to the second slide module, wherein a coupling end of the second slide module is in non-overlapping physical contact with the first coupling end of the first slide module to generate a complete rail slide comprising the first slide module and the second slide module and wherein no mechanical coupling is utilized to couple the first slide module to the second slide module.

2. The modular rail slide of claim 1, comprising a third slide module, coupled to the second slide module, comprising third inserts coupled to the third slide module, wherein the third slide module is coupled to the first slide module, and wherein the third slide module is coupled to a second coupling end on a second end of the first slide module.

3. The modular rail slide of claim 2, wherein the first slide module includes the first inserts with a first pattern, the second slide module includes the second inserts with a second pattern, and the third slide module includes the third inserts with the first pattern.

4. The modular rail slide of claim 1, wherein the first inserts coupled to the first slide module have a distance between each of the first number of inserts, wherein the distance is between 0.3 inches and 0.4 inches.

5. The modular rail slide of claim 1, wherein the first slide module has a first length that is less than a second length of the complete slide rail for a track suspension system of a snowmobile.

6. The modular rail slide of claim 5, wherein the first slide module coupled to the second slide module has a length that is equal to the length of the complete slide rail of the track suspension system.

7. The modular rail slide of claim 1, wherein a single mold is utilized to generate the first slide module and separately utilized to generate the second slide module.

8. A modular rail slide, comprising:
  a plurality of slide modules coupled together by a plurality of coupling ends positioned at each end of each of the plurality of slide modules to generate a complete slide rail with no mechanical coupling to couple the plurality of slide modules to each other, wherein a first slide module and a second slide module of the plurality of slide modules includes corresponding plurality of insert material embedded in a base material of the first slide module and the second slide module respectively, wherein a first distance between a first insert material of the plurality of insert material from the first slide module and a second insert material of the plurality of insert material from the second slide module is equal to a second distance between a third insert material of the plurality of insert material from the first slide module and a fourth insert material of the plurality of insert material from the first slide module, and wherein the plurality of slide modules are coupled together by non-overlapping physical contact between the plurality of coupling ends.

9. The modular rail slide of claim 8, wherein non-overlapping physical contact between the first slide module and the second slide module includes no physical contact from the first slide module on a sliding surface of the second slide module.

10. The modular rail slide of claim 8, wherein non-overlapping physical contact includes no portion of the plurality of slide modules being positioned between a rail beam a different slide module of the plurality of slide modules.

11. The modular rail slide of claim 10, wherein the at least one of the plurality of slide modules comprise the insert material coupled to a side portion of the at least one of the plurality of slide modules.

12. The modular rail slide of claim 8, wherein the plurality of slide modules each have a width of at least 1.5 inches.

13. The modular rail slide of claim 8, wherein the insert material is embedded as a plurality of insert material pieces on a bottom portion of the at least of one of the number of slide modules.

14. The modular rail slide of claim 8, wherein the plurality of slide modules include a number of different slide module types coupled together to generate the complete slide rail.

15. A modular rail slide system, comprising:
  a plurality of slide modules coupled to a rail beam of a suspension system with T-slots on a top side of the number of slide modules;
  a plurality of corresponding coupling ends of the plurality of slide modules to couple the plurality of slide modules together on the rail beam with the plurality of corresponding coupling ends to generate a complete slide rail coupled to the rail beam, wherein the plurality of corresponding coupling ends are in non-overlapping physical contact with no mechanical coupling between the plurality of corresponding coupling ends; and
  a U-shaped clip mechanically attached to the rail beam with an aperture of the clip positioned between an end of the rail beam and a coupling end of one of the plurality of slide modules to prevent the plurality of slide modules from being removed from the rail beam.

16. The system of claim 15, wherein the plurality of slide modules include a plurality of different slide module types that are coupled to the rail beam such that there are different slide module types coupled to the rail beam.

17. The system of claim 16, wherein the plurality of different slide module types include a base material slide module type and an insert material slide module type.

18. The system of claim 15, wherein each of the plurality of slide modules comprise a different slide module type with a different pattern of insert material.

19. The system of claim 15, wherein the plurality of corresponding coupling ends position the plurality of slide modules such that the plurality of slide modules are in physical contact with at least one other slide module from the plurality of slide modules.

20. The system of claim 17, wherein the insert material comprises at least one of:
  a polymide-based polymer material;
  a thermoplastic material reinforced with carbon fiber/ graphite/ PTFE PolyEtherEtherKetone (PEEK);
  a thermoplastic material that is not reinforced;

a PolyAmide-Imide (PAI); and
a Polybenzimidazole (PBI) material.

* * * * *